United States Patent [19]

Haag

[11] Patent Number: 5,250,199
[45] Date of Patent: Oct. 5, 1993

[54] SLUDGE SCRAPER APPARATUS

[75] Inventor: Roger Haag, DeWitt, Mich.

[73] Assignee: Enviroland, Inc., DeWitt, Mich.

[21] Appl. No.: 898,409

[22] Filed: Jun. 15, 1992

[51] Int. Cl.$^5$ ............................................. B01D 21/18
[52] U.S. Cl. ..................................... 210/803; 210/170;
210/527; 37/307; 37/341; 37/398
[58] Field of Search ................... 210/170, 527, 803;
37/54, 71, 125, 135, 74; 405/73, 74

[56] References Cited

U.S. PATENT DOCUMENTS

| | | | |
|---|---|---|---|
| 1,918,742 | 7/1933 | Elrod | 210/525 |
| 1,919,689 | 7/1933 | Elrod | 210/527 |
| 2,009,559 | 7/1935 | Mieder | 210/208 |
| 2,033,291 | 3/1936 | Laughlin et al. | 210/527 |
| 2,101,080 | 12/1937 | Lund | 210/143 |
| 3,410,412 | 11/1968 | Fechter | 210/143 |
| 4,184,958 | 1/1980 | Manchak, Jr. | 210/170 |
| 4,417,983 | 11/1983 | Smigerski et al. | 210/527 |
| 4,724,088 | 2/1988 | Zetterlund | 210/803 |

FOREIGN PATENT DOCUMENTS 1468567  3/1989  U.S.S.R. ..................... 210/527

Primary Examiner—Matthew O. Savage
Attorney, Agent, or Firm—Ian C. McLeod

[57] ABSTRACT

A sludge scraper apparatus for scraping a sludge sediment from an earthen bottom of a sludge reservoir, is described. The scraper apparatus is comprised of a main frame that provides for mounting a pair of skids, a scraper blade and a pair of wheels mounted on the apparatus. A first tow line is connected between the frame and a first winch, mounted on a first shore of the reservoir. A second tow line is connected between the skids and a second winch, mounted on a second shore of the reservoir. The first winch then moves the scraper apparatus over the earthen bottom of the reservoir from a starting position adjacent the second shore of the reservoir by spooling up the first tow line. This causes the scraper apparatus to move in a pass over the bottom of the reservoir, with the scraper blade plowing loose sludge sediment towards the first shore. Then, the second winch is used to move the sludge scraper back towards the second shore and the starting position by spooling up the second tow line. As the second winch begins to spool up the second tow line, the scraper apparatus rotates about the wheels so that the scraper blade is lifted off the bottom of the reservoir and the skids are caused to contact the reservoir bottom. In this position, the scraper apparatus can be easily pulled back towards the second shore by the second winch.

11 Claims, 2 Drawing Sheets

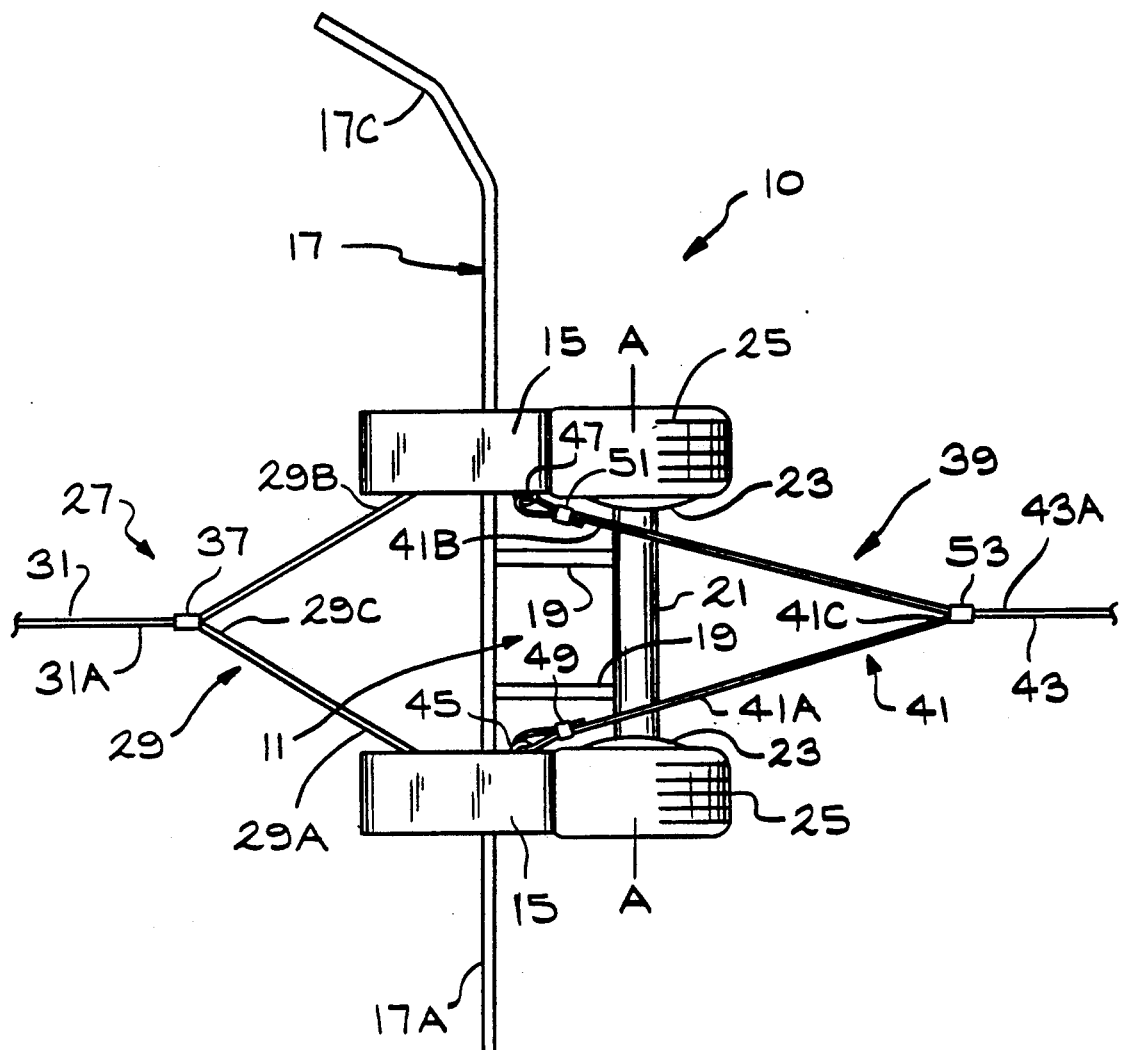
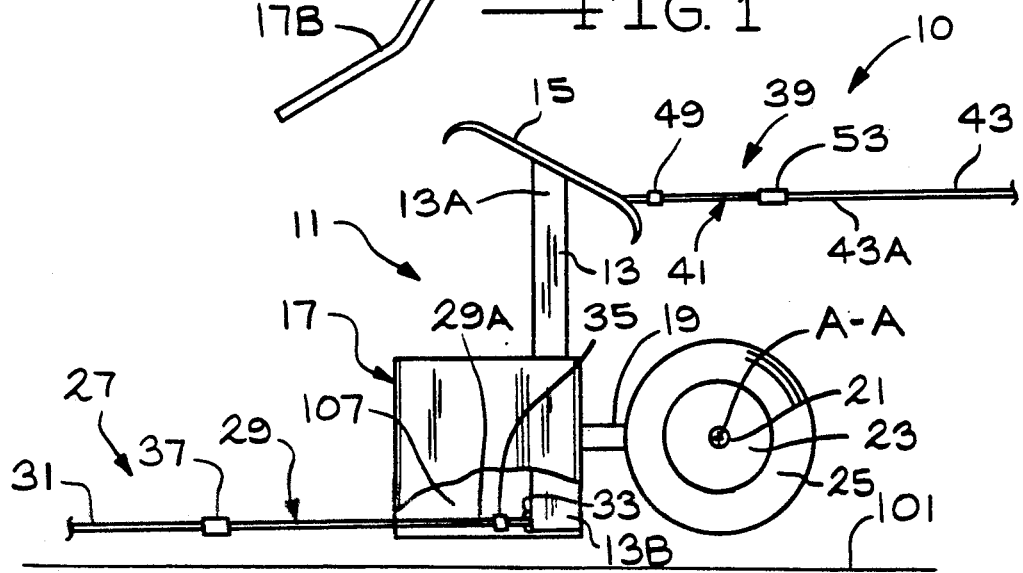

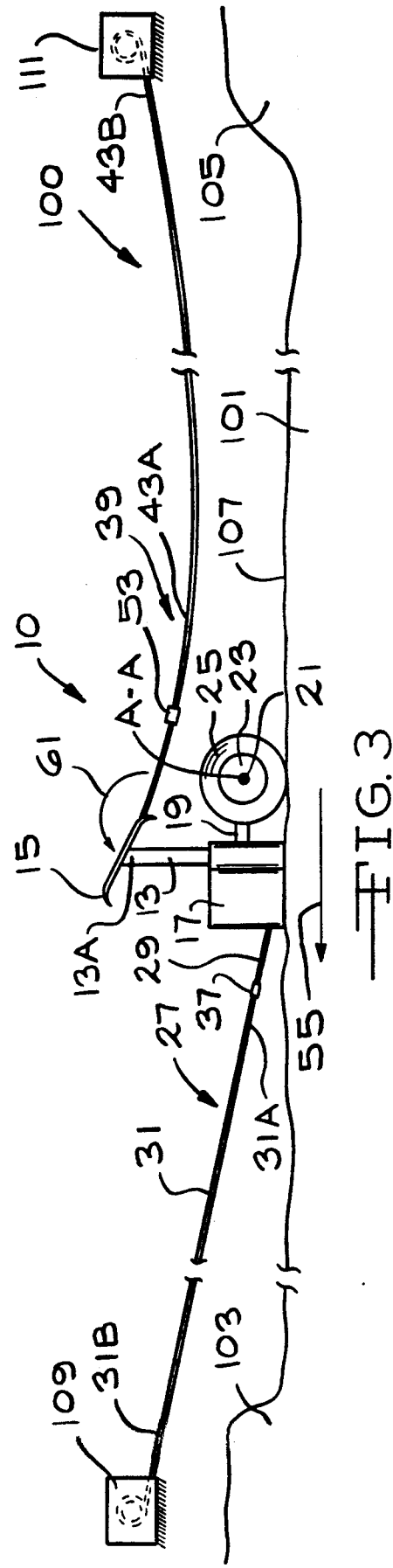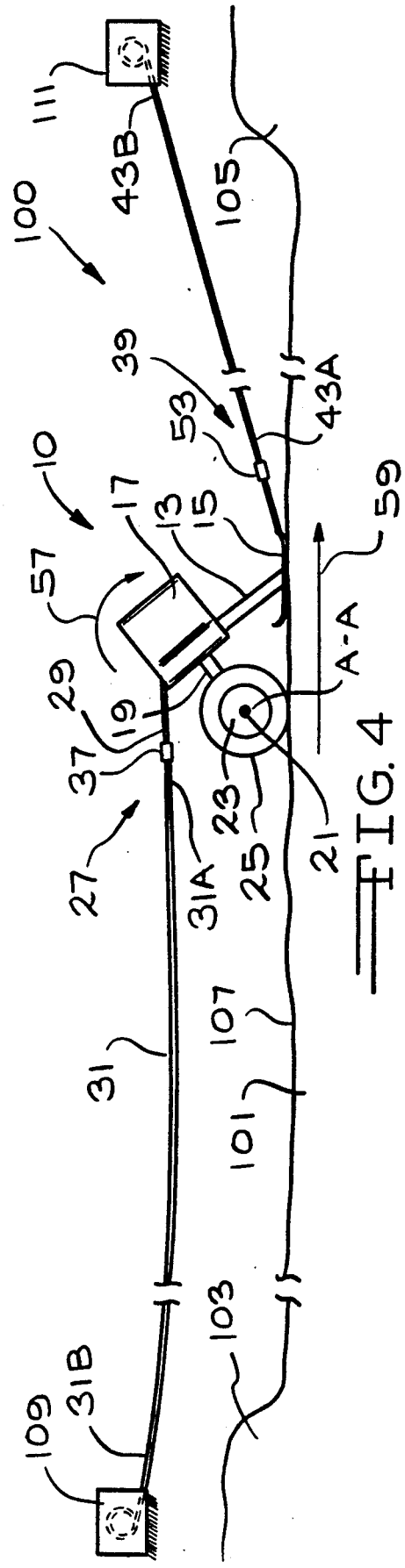

SLUDGE SCRAPER APPARATUS

BACKGROUND OF THE INVENTION (1) Field of the Invention

The present invention relates to an apparatus and a method for removing sludge sediment from a waste sewage containment reservoir. In particular, the present invention relates to a sludge scraper apparatus that can be easily moved over a waste sewage containment reservoir for scraping sludge sediment from the bottom of the reservoir. The apparatus has a main frame that mounts a scraper blade at one end and a pair of skids at an opposite end of the frame. A set of wheels are journaled to an axle that is mounted on the frame at an intermediate position between the ends of the frame. A first tow line is mounted on the one end of the frame, adjacent to the scraper blade, and is connected to a first winch mounted on a first shore of the reservoir. A second tow line is mounted on the skids and is connected to a second winch mounted on a second shore of the reservoir. The sludge scraper apparatus removes sludge sediment from the reservoir by cycling in passes over the bottom of the reservoir. A pass begins with the sludge scraper apparatus adjacent to the second shore. The first winch then spools up the first tow line, which causes the scraper blade to move over the bottom of the reservoir, plowing sludge sediment towards the first shore. Once the scraper apparatus has reached the first shore, the second winch is actuated to spool up the second tow line. This causes the sludge scraper apparatus to rotate on the wheels in a first direction with the scraper blade rotating off the bottom of the reservoir so that the skids are positioned in contact with the bottom of the reservoir. In this position, the sludge scraper apparatus is able to be pulled back towards the second shore by the second winch, moving over the bottom of the reservoir on the skids and the wheels. Once the scraper apparatus reaches the second shore, the first winch is again actuated, which causes the sludge scraper apparatus to rotate on the wheels in a second direction, opposite the first direction, so that the scraper blade contacts the bottom of the reservoir for another pass. The first and second winches are moved along the shore, preferably a distance equal to the swath of the scraper blade. This repositions the sludge scraper apparatus for another cycle. This process is repeated until the sludge sediment has been plowed from the bottom of the reservoir and piled up adjacent to the first shore. The accumulated sludge sediment can then be removed from the reservoir by a power shovel or any other suitable means.

(2) Prior Art

The prior art has described various types of apparatus for removing sludge sediment from a sludge sedimentation tank. Sedimentation tanks are rigid vessels that are usually constructed of concrete or metal to form the tank. Two general types of scraper apparatus are used to remove sludge sediment that has precipitated onto the bottom of the tank. The first type has a track or guide rail that extends across the top of the tank. A scraper apparatus rides back and forth on the rail by means of a motor or a pulley system driven by a motor. The scraper apparatus has a scraper blade that extends towards the bottom of the tank. When the scraper apparatus moves in a forward pass, the scraper blade is caused to plow sludge sediment off the bottom of the reservoir and preferably towards a sludge hopper located at one end of the tank. The scraper apparatus then moves backwards, towards the opposite end of the tank to a position ready for another forward pass. When the scraper apparatus travels in the backwards direction, the scraper blade preferably moves into a retracted position to help the backwards movement of the scraper apparatus. Illustrative of this first type of sludge scraper apparatus is U.S. Pat. Nos. 2,009,559 to Mieder; 2,033,291 to Laughlin et al; 2,101,080 to Lund; 3,410,412 to Fechter and 4,417,983 to Smigerski et al.

The second type of sludge sediment scraper apparatus moves over the bottom of the tank powered by a pulley system. The scraper apparatus is preferably provided with wheels that ride over the concrete or metal bottom of the tank. A scraper blade is positioned adjacent to the bottom of the tank as the scraper apparatus plows in a forward direction, towards a sludge hopper. On the return trip back across the bottom of the tank, the scraper blade is retracted. This second type of apparatus works well as long as the bottom of the tank is rigid enough to support the weight of the scraper apparatus. Illustrative of this type of sludge scraper apparatus is U.S. Pat. Nos. 1,918,742 to Elrod; 1,919,689 to Elrod and 4,724,088 to Zetterlund.

All the prior art sludge scraper apparatus are designed to remove sludge from sedimentation tanks that are rigid containment vessels, made from metal or concrete.

What is not shown by the prior art is a sludge scraper apparatus that is useful for removing sludge sediment from a sludge containment reservoir having a loose, earthen bottom. The prior art apparatus did not encounter the problem of removing sludge sediment from an earthen reservoir, so there was never the need to invent a scraper apparatus that can slide across the bottom of a sludge reservoir. Therefore, even though the scraper apparatus of the present invention can be used to remove sludge sediment from all types of waste sewage reservoirs and tanks, the present invention is particularly useful in sludge reservoirs having earthen bottoms. Earthen reservoir bottoms are usually made of clay or peat as a means of containing the liquids comprising the waste sewage, and clay or peat reservoir bottoms tend to be relatively soft and unconsolidated. This prohibits the use of heavy plowing equipment, such as bulldozers and apparatus similar to those shown by the prior art, which easily become bogged down in the loose sludge sediment and clay or peat.

The problem is therefore to provide a scraper which operates well in the setting where the reservoir has a bottom which is made of clay or peat. The prior art apparatus are not suitable for this setting.

OBJECTS

It is therefore an object of the present invention to provide an apparatus for removing sludge sediment from a waste sewage containment reservoir. Further, it is an object of the present invention to provide a means for moving a sludge scraper apparatus forwards and backwards over a sewage containment reservoir with a pair of opposed tow lines wherein the first tow line moves the apparatus in a first, forward pass over the reservoir to plow sludge sediment from the bottom of the reservoir and wherein the second tow line moves the scraper apparatus on skids in a second, backwards direction over the reservoir to reposition the sludge scraper apparatus for a next forward pass. Still further, it is an object of the present invention to provide a sludge scraper apparatus for removing sludge sediment from a waste sewage containment reservoir having a loose earthen bottom using a sludge scraper apparatus that will not become bogged down in the bottom of the reservoir as the sludge scraper apparatus moves over the bottom. Furthermore, it is an object of the present invention to provide a method for removing sludge sediment from a waste sewage containment reservoir having a loose earthen bottom, using a sludge scraper apparatus that will not become bogged down in the bottom of the reservoir as the sludge scraper apparatus moves over the bottom. Finally, it is an object of the present invention to provide a sludge scraper apparatus that is inexpensive to manufacture and easy to use for removing sludge sediment from a waste sewage containment reservoir. These and other objects will become increasingly apparent by reference to the following description and to the drawings.

IN THE DRAWINGS

FIG. 1 is a plan view of a sludge scraper apparatus 10 of the present invention and particularly showing a frame 11 which mounts a pair of skids 15 and a scraper blade 17 with a pair of wheels 25 mounted on the frame 11, and with a first tow line 27 and an opposed second tow line 41 connected to the sludge scraper apparatus 10 for pulling the sludge scraper apparatus 10 in opposite directions.

FIG. 2 is a side view of the sludge scraper apparatus 10 shown in FIG. 1 and particularly showing the mounting of the first tow line 27 on a beam 13 providing the frame 11, and the mounting of the second tow line 41 on one of the skids 15.

FIG. 3 is a schematic view of the sludge scraper apparatus 10 shown in FIG. 1 and particularly showing the first tow line 27 connected to a winch 109 for pulling the scraper apparatus 10 over an earthen bottom 101 of a reservoir 100 with the scraper blade 17 contacting the reservoir bottom 101 for plowing sludge sediment 107 towards the shore 103.

FIG. 4 is a schematic view of the sludge scraper apparatus 10 shown in FIG. 1 and particularly showing the second tow line 41 connected to a winch 111 for pulling the scraper apparatus 10 over the bottom 101 of the reservoir 100 after the scraper apparatus 10 has rotated on the wheels 25 so that the skids 15 are contacting the reservoir bottom 101.

GENERAL DESCRIPTION

The present invention relates to a sludge scraper apparatus for moving sludge sediment from a sludge containment means having a bottom and a sidewall extending across the bottom to form the containment means, which comprises: a frame means; a plow means mounted on a first end of the frame means; a skid means mounted on a second end of the frame means; a rotating means journaled on an axle means, which is connected to the frame means intermediate the ends of the frame means; and a first actuating means and a second actuating means, wherein the first actuating means moves the scraper apparatus in a first direction with the plow means contacting the bottom of the containment means to move sludge sediment from the bottom of the containment means and towards a first portion of the sidewall and wherein the second actuating means causes the scraper apparatus to rotate in a first direction about the axle means on the rotating means so that the skid means contact the bottom of the containment means and the plow means is removed from the bottom of the containment means and wherein the second actuating means then causes the scraper apparatus to move over the bottom of the containment means on the skid means and towards a second portion of the sidewall of the containment means.

Further, the present invention relates to sludge scraper apparatus for moving sludge sediment from a sludge containment means having a bottom and a sidewall extending from the bottom to form the containment reservoir, which comprises: a frame means; a plow means mounted on a first end of the frame means; a skid means mounted on a second end of the frame means; a rotating means journaled on an axle means, which is connected to the frame means intermediate the ends of the frame means; and a first actuating means and a second actuating means, wherein the first actuating means moves the scraper apparatus in a first direction with the plow means contacting the bottom of the containment means to move sludge sediment from the bottom of the containment means and towards a first portion of the sidewall and wherein the second actuating means causes the scraper apparatus to rotate in a first direction about the axle means on the rotating means so that the skid means contact the bottom of the containment means and the plow means is removed from the bottom of the containment means and wherein the second actuating means then causes the scraper apparatus to move over the bottom of the containment means on the skid means and towards a second portion of the sidewall of the containment means.

Finally, the present invention relates to a method for using a sludge scraper apparatus to move sludge sediment across a sludge containment means having a bottom and a sidewall extending from the bottom to form the containment means, which comprises: providing the sludge scraper apparatus having a frame means; a plow means mounted on a first end of the frame means; a skid means mounted on a second end of the frame means; a rotating means journaled on an axle means, which is connected to the scraper apparatus intermediate the ends of the frame means; a first actuating means and a second actuating means, wherein the first actuating means is connected adjacent the plow means and a first portion of the sidewall of the containment means and serves to move the scraper apparatus in a first direction over the bottom of the containment means with the plow means contacting the bottom of the containment means to move sludge sediment from the bottom of the containment means and wherein the second actuating means is connected adjacent to the skid means and a second portion of the sidewall of the containment means, and serves to cause the scraper apparatus to rotate in a first direction about the axle means on the rotating means so that the skid means contacts the bottom of the containment means and the plow means is removed from the bottom of the containment means and wherein the second actuating means is then able to cause the scraper apparatus to slide over the bottom of the containment means on the skid means; engaging the first actuating means to move the scraper apparatus on the rotating means over the bottom of the containment means in the first direction with the plow means contacting the bottom of the containment means to move sludge sediment across the bottom of the containment means; and disengaging the first actuating and engaging the second actuating means, which rotates the scraper apparatus in the first direction about the axle means on the rotating means so that the skid means contacts the bottom of the containment means and wherein the second actuating means then slides the scraper apparatus over the bottom of the containment means on the skid means and the rotating means.

The scraper apparatus of the present invention is uniquely constructed to "ride" over the bottom of the reservoir, without becoming stuck. The dual winch system, using winch units connected between the scraper apparatus and opposite sides of the shore, allows the sludge scraper apparatus to be pulled over the bottom of the reservoir, without becoming stuck. Also, the wheels journaled to the frame behind the scraper blade help to keep the scraper apparatus riding over the bottom of the reservoir. Finally, the first tow line, which connects between the one end of the frame, adjacent to the scraper blade, and the first winch, acts to pull the scraper apparatus over the bottom of the reservoir without allowing the scraper blade to bury in the sludge sediment by "nose diving" into the bottom of the reservoir.

SPECIFIC DESCRIPTION

FIGS. 1 to 4 show a sludge scraper apparatus 10 of the present invention. As particularly shown in FIGS. 1 and 2, the scraper apparatus 10 includes a frame 11 comprised of a pair of spaced apart, parallel main beam members 13 that mount a pair of skids 15 on a proximal end 13A of the main beams 13 (only one main beam member 13 is shown in FIG. 2). A plow blade or scraper blade 17 is connected to a distal end 13B of the main beams 13. scraper blade 17 has a wide cross-sectioned face portion 17A and a pair of curved ends 17B and the extending from the face 17A. A pair of sidewardly spaced lateral beam members 19 mount on the scraper blade 17 at a position between the main beams 13 and the skids 15. The lateral beams 19 extend between the scraper blade 17 and an axle 21. Axle 21 provides a pivot axis A—A for the scraper apparatus 10. A pair of rims 23 supporting wheels 25 are mounted on opposed ends of the axle 21. The wheels 25 help the scraper apparatus 10 to move in a sludge lagoon or reservoir 100 (FIGS. 3 and 4).

As shown in cross-section in FIGS. 3 and 4, the reservoir 100 is comprised of a bottom 101 and a first and second sidewalls or shore portions 103 and 105 extending from the bottom 101. Although the sidewalls 103 and 105 are shown in cross-section, it should be understood that the sidewalls 103 and 105 extend around the perimeter of the reservoir 100 to provide the reservoir 100 as a containment means. The reservoir 100 is used to hold liquid waste material (not shown) such as waste sewage and the like. The liquid waste material is held in the containment reservoir 100 for a sufficient amount of time to allow for suspended solids to precipitate from the waste material as a sludge 107. The resulting effluent liquids can then be removed from the containment reservoir 100 by any suitable means, leaving the precipitated sludge 107 (FIG. 2) behind as a sediment covering the bottom 101 of the reservoir 100.

As shown in FIGS. 3 and 4, a first tow line 27 extends between the main beams 13 and a first winch 109, which is mounted on the first sidewall 103 of the reservoir 100. The first tow line 27 is comprised of a V-shaped cable 29 and a winch cable 31. Cable 29 has spaced apart ends 29A and 29B mounted on the respective distal ends 13B of the main beams 13 (only end 29A of cable 29 is shown in FIG. 2). As shown in FIG. 2, end 29A is threaded through an eye-bolt or U-bolt 33 mounted on the distal end 13B of the main beam 13 and is secured to the bolt 33 by a clasp 35. End 29B is similarly attached to the distal end 13B of the other main beam 13 (not shown). The apex 29C of cable 29 is secured to the proximal end 31A of winch cable 31 by a clasp 37 or other suitable fastening means. The distal end 31B of the winch cable 31 is then secured to the winch 109, which serves to spool the cable 31 onto a winch drum (not shown) of the winch 109.

Similarly, a second tow line 39 extends between the skids 15 and a second winch 111, which is mounted on the second sidewall 105 of the reservoir 100. The second tow line 39 is comprised of a V-shaped cable 41 and a winch cable 43. Cable 41 has spaced apart ends 41A and 41B that mount on the skids 15. A pair of eye-bolts or U-bolts 45 and 47 are mounted to the respective skids 15. The ends 41A and 41B are then secured to the U-bolts 45 and 47 by clasps 49 and 51. The apex 41C of cable 41 is secured to the proximal end 43A of winch cable 43 by a clasp 53 or other suitable fastening means. The distal end 43B of the winch cable 43 is then secured to the winch 111, which serves to spool the cable 43 onto a winch drum (not shown) of winch 111.

IN USE

Reservoir 100 can be a rigid containment means made of metal, concrete or sheets of elastomeric material laid over a foundation. The reservoir 100 can also be an earthen containment means. In this case, it is preferred that the reservoir 100 be lined with a layer of clay or peat (not shown). Clay or peat are preferred because they are non-permeable and do not permit the seepage of leachate from the reservoir 100. In those reservoirs 100 that are built from earth, the bottom 101 of the reservoir 100 often provides a soft and unstable foundation. Thus, as explained above, the scraper apparatus 10 is uniquely constructed to move over the bottom 101 of the reservoir 100 to plow sludge 107 without burying or otherwise becoming stuck in the bottom 101 of the reservoir 100.

As schematically shown in FIGS. 3 and 4, to move sludge sediment 107 from the bottom 101 of the reservoir 100, the scraper apparatus 10 is first pulled in a forward pass (FIG. 3), from the second sidewall 105 to the first sidewall 103, as the winch cable 31 of the first tow line 27 is spooled up by the winch 109. This causes the scraper blade 17 to move over the bottom 101 of the reservoir 100 in a forward direction, as indicated by arrow 55. As this happens, sludge 107 is plowed up by the curved ends 17B and 17C and the intermediate face portion 17A of the sludge scraper 17. All the while, winch 111 is in a neutral mode to that the second tow line 39 is able to freely unspool.

The spaced apart ends 29A and 29B of the V-shaped cable 29 of the first tow line 27 are mounted on the respective distal ends 13B of the main beams 13. This creates an equilibrium of moments around the pivot axis A—A, through the axle 21, which causes the scraper blade 17 to ride over the bottom 101 of the reservoir 100, without burying in the relatively soft bottom 101. The wheels 25, which are positioned behind the scraper blade 17, also help to keep the scraper apparatus 10 rolling over the bottom 101 of the reservoir 100.

Once the scraper apparatus 10 has completed a first, forward pass and the scraper blade 17 has plowed a swath of sludge 107 towards the first sidewall 103, the first winch 109 is disengaged. This frees the first tow line 27 to be able to unspool from the winch 109. At the same time, the second winch 111 is engaged so that the second tow line 39 is able to be spooled onto the drum (not shown) of the winch 111. As explained above, the spaced apart ends 41A and 41B of the V-shaped cable 41 of the second tow line 39 are mounted to the skids 15 (FIG. 2). That way, when the second tow line 39 is spooled onto the winch 111, the moment of the scraper apparatus 10 around the axis A—A, through the axle 21 is greater in the clockwise direction than in the counterclockwise direction (FIG. 4). This causes the skids 15 to rotate in a clockwise direction around the axis A—A, as indicated by arrow 57, to a position where the sides 15 are resting on the bottom 101 of the reservoir 100. At the same time, the scraper blade 17 is rotated to a position spaced above the bottom 101 of the reservoir 100. In this position, the scraper apparatus 10 is able to be moved over the bottom 101 of the reservoir 100 and towards the second sidewall 105 in a backwards direction, as indicated by arrow 59, without plowing sludge sediment 107 by riding on the skids 17 and rolling on the wheels 25 (FIG. 4).

After scraper apparatus 10 has been moved back towards the second sidewall 105, the second winch 111 is disengaged and the first winch 109 is re-engaged. This frees the second tow line 39 to be able to unspool from the winch 111 and causes the scraper apparatus 10 to rotate in a counterclockwise direction around the axis A—A, as indicated by arrow 61, to position the scraper blade 17 on the bottom 101 of the reservoir 100. In this position, the skids 15 are rotated off of the bottom 101, which completes a cycle of the sludge scraper apparatus 10.

The winches 109 and 111 are preferably provided by a pair of bulldozers (not shown) equipped with a pair of winches 109 and 111. It should be understood that any apparatus providing a winch means is contemplated by the scope of the present invention. Also, the winches 109 and 111 are preferably moveable. That way, preferably after a cycle of the scraper apparatus 10 is completed, the winches 109 and 111 are rotated in similar directions around the perimeter of the reservoir 100. The winches 109 and 111 are preferably moved a distance equal to the width of a swath of the scraper blade 17. Once the scraper apparatus 10 has been repositioned, the above cycle is repeated in swath increments around the perimeter of the reservoir 100 until the entire bottom 101 has been scrapped clean of sludge 107. The sludge 107 collected next to the sidewall 103 is then able to be removed from the reservoir 100 by a power shovel (not shown) or other suitable shovel means.

It should be understood that the sludge scraper apparatus 10 of the present invention can also be moved over the bottom 101 of the reservoir 100 by a first and a second actuating means mounted on the sludge scraper apparatus 10. The first actuating means could be mounted on the frame 11 and be connected to the rims 23 or the wheels 25 for rotating the wheels 25 to move the sludge scraper apparatus 10. Then, with the wheels 25 in a locked position, the second actuating means, which could be mounted on the frame 11 and be connected to the rims 23 or the wheels 25, could cause the sludge scraper apparatus 10 to rotate about the axis A—A on the wheels 25 to position the skids 15 in the bottom 101 of the reservoir 100. The first actuating means could then be used to move the sludge scraper apparatus 10 over the reservoir bottom 101, supported by the wheels 25 and skids 15.

The first and second actuating means could also be provided by a single power take-off means that can engage and disengage from the rims 23 or the wheels 25. When the wheels 25 are in an unlocked position and the power take-off means is engaged, the scraper apparatus 10 would move over the bottom 101 of the reservoir 100. Then, with the wheels 25 in a locked position, the power take-off means could engage the rims 23 or the wheels 25, causing the scraper apparatus 10 to rotate about the axis A—A.

It is intended that the foregoing description be only illustrative of the present invention and that the present invention be limited only by the hereinafter appended claims.

I claim:

1. A method for using a sludge scraper apparatus to move sludge sediment across a sludge containment means having a bottom and a sidewall extending from the bottom to form the containment means, which comprises:
    (a) providing the sludge scraper apparatus having a frame means; a plow means mounted on a first end of the frame means; a skid means mounted on a second end of the frame means; a rotating means journaled on an axle means, which is connected to the scraper apparatus, intermediate the ends of the frame means; and a first actuating means and a second actuating means, wherein the first actuating means is connected adjacent the plow means and a first portion of the sidewall of the containment means and serves to move the scraper apparatus in a first direction over the bottom of the containment means with the plow means contacting the bottom of the containment means to move sludge sediment from the bottom of the containment means toward the first portion of the sidewall and wherein the second actuating means is connected adjacent to the skid means and a second portion of the sidewall of the containment means, and serves to cause the scraper apparatus to rotate in a first circular direction about the axle means on the rotating means so that the skid means contacts the bottom of the containment means and the plow means is removed from the bottom of the containment means and wherein the second actuating means is then able to cause the scraper apparatus to slide in a second direction opposite the first direction over the bottom of the containment means on the skid means toward the second portion of the sidewall;
    (b) engaging the first actuating means to move the scraper apparatus on the rotating means over the bottom of the containment means in the first direction with the rotating means on the bottom of the containment means and the plow means contacting the bottom of the containment means to move sludge sediment across the bottom of the containment means toward the first portion of the sidewall; and
    (c) disengaging the first actuating and engaging the second actuating means, which rotates the scraper apparatus in the first circular direction about the axle means on the rotating means so that the skid means contacts the bottom of the containment means and wherein the second actuating means then slides the scraper apparatus over the bottom of the containment means on the skid means and the rotating means in the second direction.

2. The scraper apparatus of claim 1 wherein the bottom of the containment means is earthen and unstably soft so that the rotating means supports the scraper apparatus as the scraper apparatus moves over the bottom of the containment means in the first direction and the skid means and the rotating means support the scraper apparatus as the scraper apparatus moves over the bottom of the containment means in the second direction.

3. The method of claim 1 wherein the first actuating means comprises a first winch means and a first connection means connected between the first winch means and the frame means and wherein the second actuating means comprises a second winch means and a second connection means connected between the second winch means and the skid means.

4. The method of claim 3 wherein the first and second connection means are comprised of a first and a second cable means.

5. The method of claim 1 wherein the first and the second actuating means are moved around a perimeter of the containment means for systematically moving sludge sediment from the bottom of the containment means.

6. The method of claim 1 wherein the frame means is comprised of a support beam means having opposed first and second ends with the plow means connected to the first end of the support beam means and with the skid means connected to the second end of the support beam means and wherein the axle means, which mounts the rotating means, is mounted to an additional beam means connected to and extending outward from the plow means, intermediate the opposed ends of the support beam means.

7. The method of claim 6 wherein the first actuating means is connected to the first end of the support beam means and the second actuating means is connected to the skid means mounted on the second end of the support beam means.

8. The method of claim 6 wherein the support beam means of the frame means is comprised of a pair of support beam members spaced apart along the plow means, each having first and second ends and connected together by the plow means mounted at the first end of the support beam members and wherein the additional beam means is comprised of a pair of additional beam members spaced apart along the plow means and extending between the plow means and the axle means.

9. The method of claim 1 wherein the plow means is a plow blade means having a face portion with a wide cross-section between opposed, spaced apart ends and wherein a plane of the face portion of the plow blade means is parallel to a longitudinal axis of the axle means with the spaced apart ends of the plow blade means angled away from the axle means.

10. The method of claim 1 wherein the rotating means are a pair of spaced apart wheel means.

11. The method of claim 1 wherein after the second actuating means causes the scraper apparatus to slide over the bottom of the containment means on the skid means, the first actuating means is then able to cause the scraper apparatus to rotate in a second circular direction opposite the first circular direction about the axle means on the rotating means with the plow means contacting the bottom of the containment means so that the scraper apparatus is moveable over the bottom of the containment means by the first actuating means.

* * * * *